United States Patent
Apte et al.

(10) Patent No.: US 7,617,981 B2
(45) Date of Patent: Nov. 17, 2009

(54) METHOD AND SYSTEM FOR TARGETED MARKETING BY LEVERAGING VIDEO-BASED DEMOGRAPHIC INSIGHTS

(75) Inventors: Chidanand Apte, Chappaqua, NY (US); Brenda Lynn Dietrich, Yorktown Heights, NY (US); Arun Hampapur, Norwalk, CT (US); Andrew W. Senior, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 11/759,367

(22) Filed: Jun. 7, 2007

(65) Prior Publication Data
US 2007/0228141 A1    Oct. 4, 2007

Related U.S. Application Data

(63) Continuation of application No. 11/116,409, filed on Apr. 28, 2005, now Pat. No. 7,267,277.

(51) Int. Cl.
*G06K 7/10* (2006.01)
(52) U.S. Cl. .............................. 235/454; 705/16; 705/18
(58) Field of Classification Search ................. 235/454, 235/462.01; 902/22; 705/14, 16, 18, 21
See application file for complete search history.

(56) References Cited

U.S. PATENT DOCUMENTS

| | | | |
|---|---|---|---|
| 6,314,451 B1 | 11/2001 | Landsman et al. | |
| 6,408,278 B1 | 6/2002 | Carney et al. | |
| 6,484,148 B1 | 11/2002 | Boyd | |
| 2005/0096985 A1 | 5/2005 | Werden | |
| 2005/0149398 A1 | 7/2005 | McKay | |

OTHER PUBLICATIONS

Lawrence et al..; "Personalization of Supermarket Production Recommendations"; Kluwer Academic Publishers; Jul. 7, 2000.
Abe et al.; "Cross Channel Optimized Marketing by Reinforcement Learning"; KDD '04, Seattle, WA; Aug. 22-25, 2004.
Apte et al.; "Segmentation-Based Modeling for Advanced Targeting Marketing"; RC 21982 (98791); Mar. 8, 2001.

*Primary Examiner*—Daniel A Hess
(74) *Attorney, Agent, or Firm*—Whitham, Curtis, Christofferson & Cook, P.C.; Stephen C. Kaufman

(57) ABSTRACT

Demographic and transaction data are presented in a report usable for marketing-related purposes and other applications using a camera apparatus to capture customer image data at a point-of-sale location and sends the image data to a customer image database where the image data is stored. Demographic data (such as gender, age group, height) are extracted from the customer image data and sent to the customer image database. Point-of-sale transaction data is collected and sent to a transaction database where the transaction data is stored. A computer processes customer image data, transaction data, and attributes relating to the customer image data and transaction data, to correlate extracted demographic data to transaction data. The correlated data is preferably sent to a target marketing database and used to generate a market research report.

1 Claim, 2 Drawing Sheets

METHOD AND SYSTEM FOR TARGETED MARKETING BY LEVERAGING VIDEO-BASED DEMOGRAPHIC INSIGHTS

CROSS-REFERENCE TO RELATED APPLICATIONS

This application is a continuation of U.S. Ser. No. 11/116,409, filed Apr. 28, 2005, now U.S. 7,267,277 and the complete contents thereof is hereby incorporated by reference.

BACKGROUND OF THE INVENTION

1. Field of the Invention

The present invention generally relates to the gathering and compilation of data for market research purposes and, more particularly, to the gathering of point-of-sale transaction data for market research purposes.

2. Background Description

Retail enterprises utilize targeted marketing to optimize marketing expense versus revenue (purchase) response. For example, retail marketers may use transaction-related demographic data to construct customer-centric historical transactions that tie in past promotions, purchases, and census demographics to build response models for revenue, profit, delinquency, and other factors. Such response models may be employed to manage ongoing and future marketing campaigns. These models are most commonly employed in connection with retail distribution channels where individual customers can be fully identified, such as direct mail and Internet commerce, because the models require historical data identifying particular customers to particular transactions.

Because of the need for transaction-related data, response models are not typically employed in the most pervasive and widely used retail channel—the retail store. In a retail store environment:

The customer base tends to be largely unknown;
Shoppers typically make purchases using payment media, such as cash or credit cards, which do not provide demographic data; and
Outside of a few segments such as grocery retailing, retail loyalty programs do not have large-scale subscription or usage.

Various other factors may also impede the collection of transaction-related demographic data in a retail environment. The fact that a shopper may walk through a store without making a purchase, even while dwelling in certain areas more than others, makes demographic data on overall customer traffic an ineffective substitute for demographic data that has been correlated to transaction data.

Thus, the present invention recognizes the problem that, without the capability to obtain transaction-related demographic data, it is next to impossible to use response modeling or other data analytic techniques to increase the effectiveness of targeted marketing in a retail store environment.

SUMMARY OF THE INVENTION

It is therefore an object of the present invention to provide a system and method for obtaining transaction-related demographic data in a retail store environment. This is accomplished by leveraging in-store security camera systems to obtain still images or video signal sequences from which demographic information can be extracted.

The present invention combines and aggregates point-of-sale transactional data with information extracted from still images or video sequences, applies data mining to this aggregated data, and uses insights from the data mining to improve item promotions and targeted marketing on the retail floor.

Types of data that may be obtained from point-of-sale terminals include, without limitation, the following:
Date and time of day
Item category
Item number (e.g., SKU or other inventory control identifier)
Item cost
Tax
Total amount of purchase
Type of payment (e.g., cash, charge, debit)
And so forth Types of data that may be extracted from still images or video signal sequences include, without limitation, the following:
Date and time of day, or other attributes that may be used to correlate demographic data to transaction data
Gender
Ethnicity
Age group (e.g., child, teenager, adult, senior, etc.)
Socio-economic status signals (e.g., well-dressed)
Dwell times (i.e., amount of time spent browsing or lingering in an area, which may signal preferences for certain merchandise categories)
Size of party (e.g., individual or group, small or large party, number of people in party, etc.)
Height (tall, short, etc.)
And so forth Insights available from data analytic and data mining techniques that correlate or aggregate point-of-sale transactional data with demographic data extracted from video signal sequences may apply data analytic and data mining techniques to develop clusters, associations, and predictive models. For example, area traffic patterns may be analyzed in terms of gender, ethnicity, age, socio-economic status, and other factors. Point-of-sale transaction data may be aggregated or categorized into "times of day." In applying such techniques, the focus will typically be on obtaining correlations between time, demographics, and items sold. Examples of the types of conclusions that might be reached as a result of such an application of data analytic or data mining techniques include, without limitation, the following hypothetical examples:

The fastest selling products during the early evening hours may be found to be DVDs and CDs, as it may be found that shoppers during the early evening hours are predominantly teenagers.
It may be found that mothers with children in strollers tend to be the predominant shoppers in the Baby section between 10:00 a.m. and 11:00 a.m.
Male adults may be found to crowd a store's hardware section on Saturday mornings.

Insights of this nature may be used to improve product promotions and targeted marketing (including, but not limited to, store personnel focus) on the retail sales floor, linking insights may obtained from data mining to general census-based mailing lists for targeted marketing.

Thus, the present invention provides a system and method for obtaining demographic marketing data comprising a camera apparatus that may be used to capture customer image data at a point-of-sale location and to send the images to a customer image database, in which the image data may be stored and classified by one or more attributes, including at least one attribute (including, but not limited to date and time of day) to identify customer image data to relevant transactions at corresponding point-of-sale locations. The camera apparatus may or may not include a video camera, and the camera apparatus may or may not include more than one camera. Video camera systems may provide more data than still image systems and may be more likely to be found already in place in retail environments in the form of video surveillance systems.

Demographic data may be extracted from customer image data by an available means. The means for extracting demographic data may be fully automated instead of employing a human operator to input demographic data attributes based on observation of the customer image. When the camera apparatus includes more than one camera, the means for extracting demographic data from customer image data may or may not include a means to enable customer images from one camera to be correlated with customer images from another camera.

The demographic data thus extracted may or may not include at least one of the following: gender, ethnicity, age group, socioeconomic status signals, dwell time, size of party, height. Some dimensions of demographic data, including but not limited to height and dwell time (i.e., amount of time spent browsing or lingering in an area), may be more readily extracted through automated means. Some dimensions of demographic data may be used as proxies for others, including but not limited to the use of height ranges as proxies for gender.

Extracted demographic data may be sent to the customer image database as one or more attributes associated with a customer image. The demographic data may or may not be extracted from customer image data before the customer image data is sent to the customer image database from the camera apparatus.

A transaction data collection apparatus may be used to collect transaction data at a point-of-sale location and to send the transaction data to a transaction database, in which the transaction data may be stored and classified by one or more attributes including attributes to identify transaction data to particular transactions, or aggregations of transactions, at particular times on particular days during which the transaction data were collected at particular point-of-sale locations. The transaction data collection apparatus may or may not be a retail checkout scanner.

A computer may be connected to the customer image database and the transaction database. The computer may be used to process customer image data, transaction data, and attributes relating to the customer image data and transaction data. Processing performed by the computer may include correlating extracted demographic data to transaction data for items purchased and sending correlated data to a target marketing database. Processing performed by the computer may also include using correlated data to generate a market research report. The computer may or may not generate a market research report on a real time basis in response to an operator request for a report correlating specified categories of demographic data and specified categories of transaction data. Thus, the computer may generate formal marketing reports on a period basis; alternatively, the computer may respond on a real time basis to ad hoc queries from operators engaged in market research, market planning, and other marketing-related activities. The market research report may nor may not comprise a response model.

A computer implemented system for obtaining a report correlating demographic data and transaction data at a point-of-sale location may comprise: a camera or equivalent imaging device for obtaining customer image data at a point-of-sale location; a transaction data collector for collecting transaction data at said point-of-sale location; and a computer or network of computers which (a) classifies one or more images or portions of said images obtained with the camera or equivalent imaging device, using extracted information from the customer image data, into one or more categories based on one or more attributes that correspond to said extracted information, (b) classifies one or more transactions obtained with said transaction data collector into one or more categories based on one or more attributes, (c) correlates one or more classified images or portions of images with one or more classified transactions, and (d) generates a report of the correlated information from (c).

The system described in the preceding paragraph may or may not include a printer for printing said report from (d), above. Similarly, the system may or may not include a display for displaying said report from (d), above. The camera or equivalent imaging device employed by the system may or may not be a video camera or a still camera. In addition, the system may or may not employ a scanner as a transaction data collector, and such a scanner may or may not read bar codes or radio frequency identification (RFID) tags. The system may or may not classify images under (a), above, according to: one or more of gender, ethnicity, age, and socio-economic status; one or more of size and height; or dwell time. The computer employed by the system to classify images under (a), above, may or may not operate in an interactive manner or in an automated manner for classifying the images. The categories employed by the system to classify transactions under (b), above, may or may not include one or more of date, time of day, and type of good. Finally, the report generated by the system under (d), above, may or may not include a response model.

A method for obtaining a report correlating demographic data and transaction data at a point-of-sale location may comprise the steps of: obtaining customer image data at a point-of-sale location using a camera or equivalent imaging device; collecting transaction data at said point-of-sale location; classifying one or more images or portions of images obtained with the camera or equivalent imaging device, using extracted information from said customer image data, into one or more categories based on one or more attributes that correspond to said extracted information; classifying one or more transactions obtained with said transaction data collector into one or more categories based on one or more attributes; correlating one or more classified images or portions of images with one or more classified transactions; and generating a report of the correlated information.

The method described in the preceding paragraph may or may not employ a scanner in the step of collecting transaction data is obtained using a scanner. In addition, the method may or may not accomplish the step of classifying one or more images by using a computer interactively or automatically.

Given the challenges of doing effective retail floor targeted marketing, the retail industry needs such new capabilities to improve the effectiveness of retail marketing. Video data mining technology is at the forefront of enabling enhanced retail-store-based customer relations management.

BRIEF DESCRIPTION OF THE DRAWINGS

The foregoing and other objects, aspects and advantages will be better understood from the following detailed description of a preferred embodiment of the invention with reference to the drawing, in which FIG. 1 is a representation of a system employing the method for obtaining demographic marketing data of the present invention, while

DETAILED DESCRIPTION OF A PREFERRED EMBODIMENT OF THE INVENTION

Figure 1:
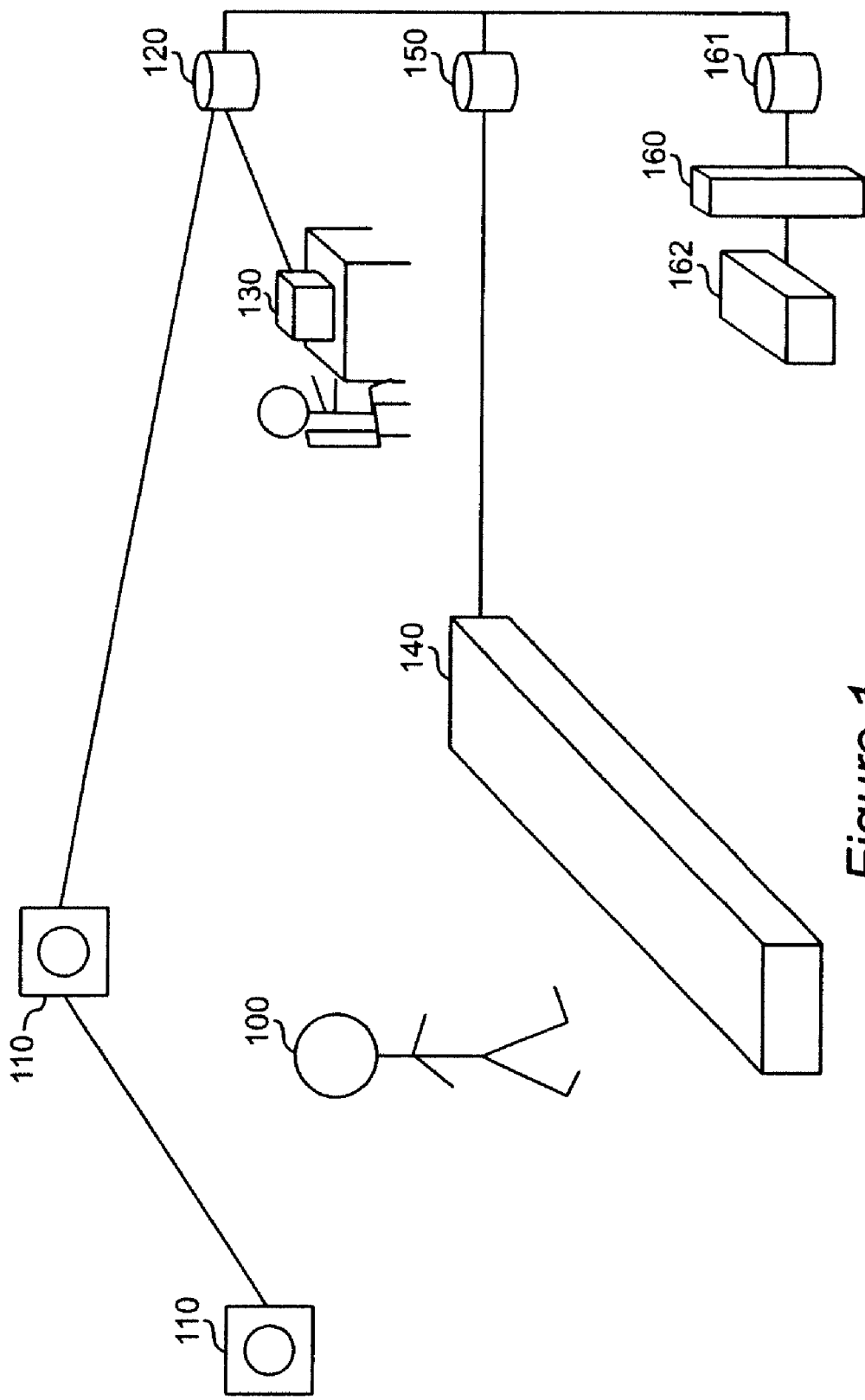

Referring now to FIG. 1, there is shown a customer 100 at a point-of-sale location being surveilled by a camera apparatus 110 which captures image data of the customer and sends the image data to a customer image database 120. The image data are classified by one or more attributes to enable a customer image, or aggregation of customer images, to be identified as relating to a particular transaction, or aggregation of transactions, for which transaction data is available in the transaction database 150. A means 130 is provided for extracting demographic data from the customer images captured by the camera apparatus 110. The extraction means 130 can be a workstation that is either interactively operated by a technician to extract demographic data or a workstation automatically operable using software, hardware, and/or firmware for extracting the demographic data from customer images. A transaction data collection apparatus 140, in this case a retail checkout scanner, collects transaction data at point-of-sale location and sends the transaction data to a transaction database 150, in which the transaction data are stored and classified by one or more attributes including, without limitation, at least one attribute to identify transaction data as relating to a particular transaction, or aggregation of transactions, for which customer image data is available in the customer image database 120. A computer 160, which is connected to the customer image database 120 and the transaction database 150, processes customer image data, transaction data, and attributes relating to the customer image and transaction data. The processing includes, without limitation, correlating extracted demographic data to transaction data, sending correlated data to a target marketing database 161, and using correlated data to generate a report, such as a market research report, which in this embodiment is a formal report produced by a laser printer 162 or other graphics output device.

Figure 2:
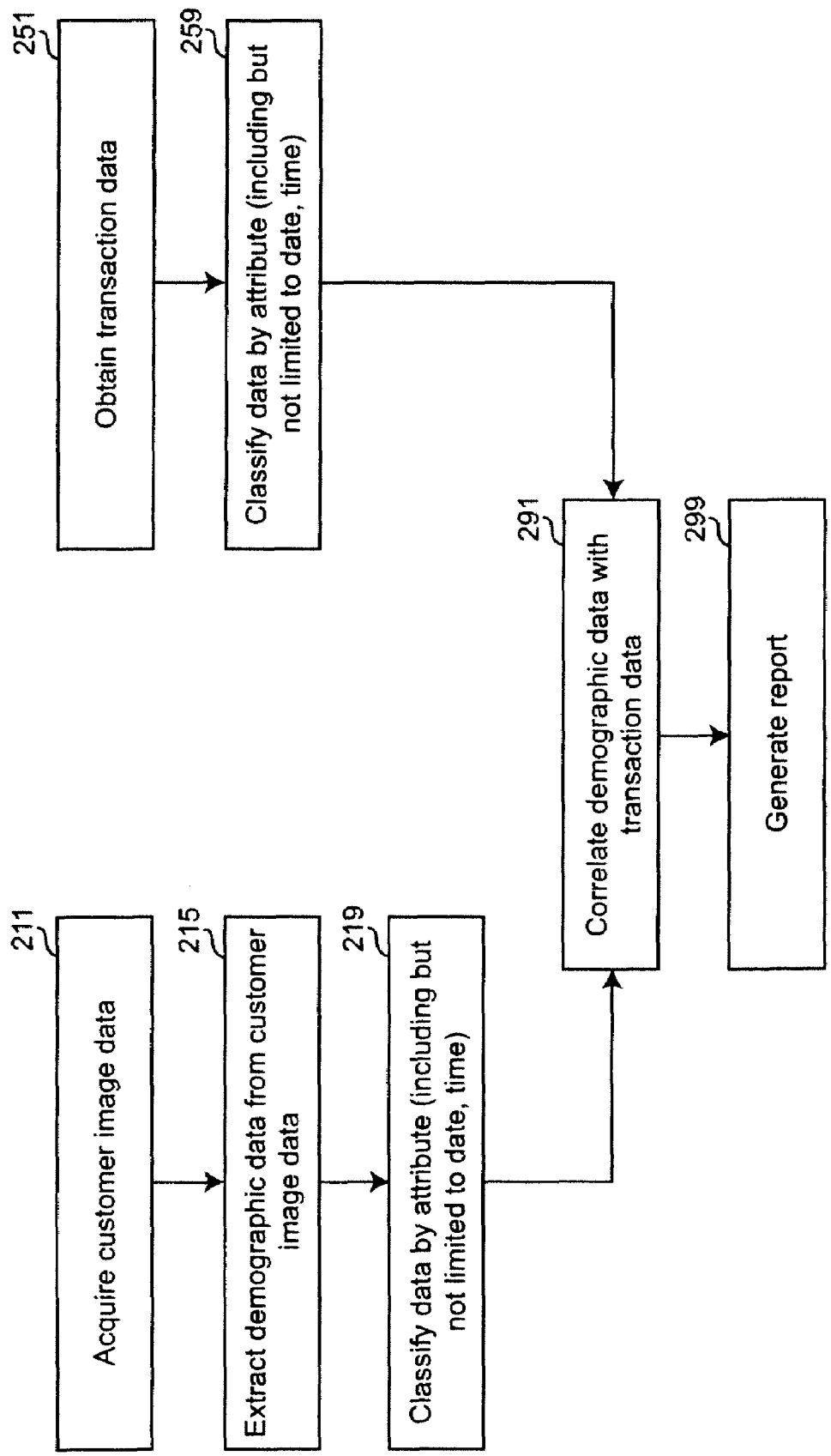
FIG. 2 represents steps required for a preferred embodiment of the method of the claimed invention.

Referring now to FIG. 2, there is shown a step 211 of acquiring customer image data (such as may be done by use of an in-store camera apparatus as shown in FIG. 1). In step 215, demographic data is extracted from the acquired customer image data. In step 219, the data are classified by attributes (including but not limited to date and time of day) which may be used to correlate demographic data to transaction data. Also in FIG. 2, there is shown a step 251 of obtaining transaction data (such as may be done using scanner data from an in-store checkout system as shown in FIG. 1). In step 259, transaction data thus obtained are classified by attributes (including but not limited to date and time of day) which may be used to correlate transaction data to demographic data. Finally in FIG. 2, there is shown a step 291 of correlating demographic data with transaction data. In step 299, the correlated data is used to generate a report.

While the invention has been described in terms of a single preferred embodiment, those skilled in the art will recognize that the invention can be practiced with modification within the spirit and scope of the appended claims.

The invention claimed is:

1. A method for generating statistical analysis of customer demographics and point-of-sale transactions, comprising:

receiving a transaction data from a point of sale terminal, having transaction data reflecting a customer transaction, and generating a corresponding plurality of transaction attributes including a transaction date/time data, a purchased item identifier attribute, and a purchase price attribute;

optically scanning the transaction location over a time period including the transaction date/time represented by said transaction date/time data, and generating a corresponding time sequence of customer image data associated with said transaction, said customer image data including a scanning date/time data;

extracting a plurality of customer attributes from said time sequence of customer image data associated with said transaction, said attributes including a customer age attribute, a customer gender attribute, and a customer demographic attribute;

classifying said customer according to said extracted customer attributes associated with said transaction, based on a given customer classification scheme, wherein said customer classification scheme includes a customer demographic classification, and generating a corresponding customer classification data having a customer demographic classification data, wherein said classifying is based in part on said transaction date/time data;

classifying said transaction according to said attributes associated with said transaction, based on a given transaction classification scheme, wherein said classification scheme includes a transacted item classifier, and generating a corresponding transaction classification data having a transacted item classification data;

repeating said receiving a transaction data from a point of sale terminal, optically scanning the transaction location, extracting a plurality of customer attributes, classifying said customer, and classifying said transaction over a given time period to generate a plurality of customer classifier data and transaction classifier data;

storing said plurality of customer classifier data and transaction classifier data to form a transaction database reflecting a plurality of transaction and, for each transaction, the corresponding customer classification data and transaction classification data;

correlating said customer classification data and said transaction classification data, said correlating including calculating a correlation between the customer demographics classification data and the items transacted classification data, and generating a corresponding correlation data; and generating a market report data, based on said correlation data.

* * * * *